United States Patent
Chen et al.

(10) Patent No.: US 9,107,131 B2
(45) Date of Patent: Aug. 11, 2015

(54) PRE REGISTRATION/PRE AUTHENTICATION IN WIRELESS NETWORKS

(75) Inventors: Jyh-Cheng Chen, Bridgewater, NJ (US); Tao Zhang, Fort Lee, NJ (US); Zong-Hua Liu, Taiwan (TW)

(73) Assignee: TTI Inventions D LLC, Wilmington, DE (US)

( * ) Notice: Subject to any disclaimer, the term of this patent is extended or adjusted under 35 U.S.C. 154(b) by 855 days.

(21) Appl. No.: 12/634,842

(22) Filed: Dec. 10, 2009

(65) Prior Publication Data

US 2011/0044264 A1 Feb. 24, 2011

Related U.S. Application Data

(60) Provisional application No. 61/234,757, filed on Aug. 18, 2009.

(51) Int. Cl.
*H04W 8/00* (2009.01)
*H04W 36/24* (2009.01)
*H04W 36/00* (2009.01)

(52) U.S. Cl.
CPC ........ *H04W 36/245* (2013.01); *H04W 36/0016* (2013.01); *H04W 36/0061* (2013.01)

(58) Field of Classification Search
USPC ......................................................... 370/328
See application file for complete search history.

(56) References Cited

U.S. PATENT DOCUMENTS

| | | | |
|---|---|---|---|
| 5,396,253 A * | 3/1995 | Chia | 342/104 |
| 6,175,735 B1 | 1/2001 | Meyer | |
| 6,320,855 B1 | 11/2001 | Shi | |
| 6,993,458 B1 * | 1/2006 | Castelli et al. | 702/186 |
| 8,036,174 B2 | 10/2011 | Park et al. | |
| 2002/0107026 A1 | 8/2002 | Agrawal et al. | |
| 2002/0181419 A1 * | 12/2002 | Zhang et al. | 370/331 |
| 2003/0016655 A1 * | 1/2003 | Gwon | 370/352 |
| 2006/0046709 A1 * | 3/2006 | Krumm et al. | 455/422.1 |
| 2006/0160540 A1 | 7/2006 | Strutt et al. | |
| 2008/0013493 A1 | 1/2008 | Wu et al. | |
| 2009/0017823 A1 * | 1/2009 | Sachs et al. | 455/437 |
| 2009/0047958 A1 * | 2/2009 | Rimhagen et al. | 455/436 |
| 2010/0061322 A1 | 3/2010 | Kim et al. | |

(Continued)

FOREIGN PATENT DOCUMENTS

EP   0 701 382    3/1996
JP   2000-312379   11/2000

(Continued)

OTHER PUBLICATIONS

Written Opinion on PCT/US2010/045826, mailed Oct. 20, 2010.

(Continued)

*Primary Examiner* — Sulaiman Nooristany (57) ABSTRACT

A system and method is provided to manage wireless network mobility and wireless network resources. In one aspect of the invention, network equipment acquires samples associated with time that past user devices stayed in the coverage range of the network equipment and estimates a time that a user device currently stays in the cell based on the acquired samples. In another aspect, pre-authentication and pre-registration of the user device in another network are performed based on the estimated time. In yet another aspect, network resources reserved for the user device are released based on the estimated time.

29 Claims, 9 Drawing Sheets

(56) References Cited

U.S. PATENT DOCUMENTS

2010/0189074 A1* 7/2010 Liao .............................. 370/331
2010/0279697 A1* 11/2010 Yang et al. ................... 455/446
2011/0044264 A1 2/2011 Chen et al.

FOREIGN PATENT DOCUMENTS

| JP | 2007-019982 | 1/2007 |
|---|---|---|
| KR | 10-2008-0047293 | 5/2008 |
| KR | 10-2008-0051340 | 6/2008 |
| WO | WO-2004/040933 | 5/2004 |
| WO | W-2007/063427 | 6/2007 |
| WO | WO-2008/133566 A1 | 11/2008 |
| WO | WO-2009/055991 | 5/2009 |
| WO | WO-2010/023023 | 3/2010 |

OTHER PUBLICATIONS

International Search Report dated Oct. 20, 2010, 2 pages.
Eric van den Berg, Tao Zhang, Jasmine Chennikara, Prathima Agrawal, Toshiakazu Kodama "Time series-based localized predictive resource reservation for handoff in multimedia wireless networks" Communications, 2001. ICC 2001. IEEE International Conference on IEEE Explorer, Jun. 14, 2001, vol. 2, pp. 346-350.
Ikram Smaoui, Faouzi Zarai, Lotfi Kamoun, "An anticipated handoff management mechanism for next generation wireless networks" Communications, Propagation and Electronics, 2008. MIC-CPE 2008. 2008 Mosharaka International Conference on IEEE Explorer, Mar. 8, 2008, p. 1-6.
Office Action on Japanese Application 2012-525654, dated Feb. 6, 2014 (English translation not available).
Sunghyun Choi, Kang G. Shin, "Predictive and adaptive bandwidth reservation for hand-offs in QoS-sensitive cellular networks" SIGCOMM '98 Proceedings of the ACM SIGCOMM '98 conference on Applications, technologies, architectures, and protocols for computer communication, Oct. 3, 1998, pp. 156-158.
Extended European Search Report on EP Application 10810524.8, mailed Oct. 15, 2014.

* cited by examiner

PRE REGISTRATION/PRE AUTHENTICATION IN WIRELESS NETWORKS

CROSS-REFERENCE TO RELATED APPLICATIONS

This application claims the benefit of the filing date of U.S. Provisional Patent Application No. 61/234,757, filed Aug. 18, 2009, the disclosure of which is hereby incorporated herein by reference.

BACKGROUND

The present invention generally relates to methods and systems for performing pre-registration/pre-authentication and reserving resources in wireless communications networks and more specifically to the use of such methods and systems in an Evolved Universal Terrestrial Radio Access Network (E-UTRAN) and an evolved High Rate Packet Data (eHRPD) network.

Fourth-generation (4G) wireless systems are end-to-end (from radio access networks to core networks) all-IP systems. 4G systems are expected to upgrade existing communication networks, e.g., 3G networks, and provide secure ubiquitous IP-based communications on an "Anytime, Anywhere" basis at significantly higher data rates. 4G networks are anticipated to enhance existing services (e.g., voice, e-mail) and provide new services such as, for example, wireless broadband access, video chat, mobile TV, HDTV content and digital video broadcasting (DVB). Such networks are expected to enhance spectral efficiency (more bits/unit of time per unit of frequency) and provide more capacity, smooth handoffs, seamless connectivity, and global roaming across multiple networks.

A leading 4G wireless system is the Evolved Packet System (EPS) defined by the Third Generation Partnership Project (3GPP). It includes Long Term Evolution (LTE) for radio access networks (RANs) and Service Architecture Evolution (SAE) for the core network. It also includes an architecture for interworking with other wireless technologies such as 3GPP2 such as 3GPP2 Evolution-Data Optimized (EV-DO) to support heterogeneous wireless access technologies and to allow graceful network evolution. The radio access network and core network defined by 3GPP LTE and SAE are referred to as Evolved Universal Terrestrial Radio Access Network (E-UTRAN) and Evolved Packet Core (EPC), respectively.

EV-DO generally refers to the 3GPP2 High Rate Packet Data (HRPD) and Evolved HRPD (eHRPD) standards. HRPD is a CDMA2000 based technology for packet transmission as described in the 3GPP2 C.S0024-A v3.0 specification. An eHRPD network provides a radio access network that supports an evolved mode of operation and provides an IP environment supporting attachment to multiple packet data networks via the 3GPP EPC. The interworking architecture is referred to as E-UTRAN and eHRPD Interworking as described in the 3GPP2 X.S0057 specification.

While standards bodies such as the 3GPP and 3GPP2 have done a significant amount of work in providing high level specifications associated with internetworking architectures (e.g., see FIG. 1), call flows (e.g., see FIG. 2) and the user equipment or mobile station/device handoffs between networks, much detail is left to implementation. For example, with reference to FIG. 2, procedures associated with when to pre-register are unspecified (see block 208 in FIG. 2). In addition, procedures for determining how long resources should be reserved are similarly open to design implementation (see block 218 in FIG. 2).

As a general matter, standard bodies usually do not standardize algorithms for performing pre-registration and pre-authentication. Accordingly, different approaches have been proposed to reduce handoff delay using pre-authentication and pre-registration. In one approach, the user equipment or mobile station, either working independently or in collaboration with one or more base stations, selects neighboring base stations it is likely to visit and participate in performing pre-registration/pre-authentication, proactive key distribution, and other procedures with candidate base stations before the user equipment or mobile station is handed off to neighboring networks. Most existing pre-registration/authentication mechanisms typically focus, however, on predicting the user equipment movement and, based on such movement, how to select target base stations that the user equipment station may be handed off to.

More specifically, some mechanisms use a centralized database associated with a server to collect the user equipment movement histories between cells to predict future handoff behavior through, for example, constructing neighbor graphs among access points in a WiFi network. However, the extra signaling messages exchanged between access points may cause consistency problem in signaling to other access points which do not employ the same algorithm. Furthermore, the centralized server is likely to become a performance bottleneck. In addition, this technique is not suitable for heterogeneous networks (networks using different access technologies) because the access points need to be under the same administrative domain.

In other mechanisms, each access point records the average required time intervals that a mobile station or the user equipment can reach its neighbors. When the user equipment requests pre-authentication, the serving access point helps to identify all the neighbors which satisfy the requirement. These mechanisms become hard to implement where there are a large number of mobile stations.

In view of existing techniques, some technical issues need to be resolved to allow for pre-registration/pre-registration to effectively reduce handoff delay. As mentioned above, one issue is when to perform pre-registration/pre-authentication. A mobile device or the or the user equipment may move at any speed and leave its current cell at any time. If pre-registration/pre-authentication is to be performed, it should be executed before actual handoff occurs. However, when the current cell is small and the user equipment is moving at high speed, the user equipment may not have sufficient time to perform pre-registration/pre-authentication with some or even any of the neighboring cells. It is therefore important to decide when and whether to trigger pre-registration/pre-authentication with neighboring cells.

Another issue is which neighboring networks or cells should pre-registration/pre-authentication be performed with. The user equipment may move in any direction and may change its moving direction at any time. It is therefore important to decide the neighboring cells with which the user equipment should perform pre-registration and pre-authentication. If pre-registration and pre-authentication is to be performed with multiple neighboring networks or cells, it is also important to determine the order in which the user equipment performs pre-registration and pre-authentication with these neighboring cells. This is because pre-registration and pre-authentication are time consuming and the mobile may leave its current cell before it completes the pre-registration and pre-authentication operations with all the neighboring networks or cells it sought to pre-register and pre-authenticate with.

Figure 2:
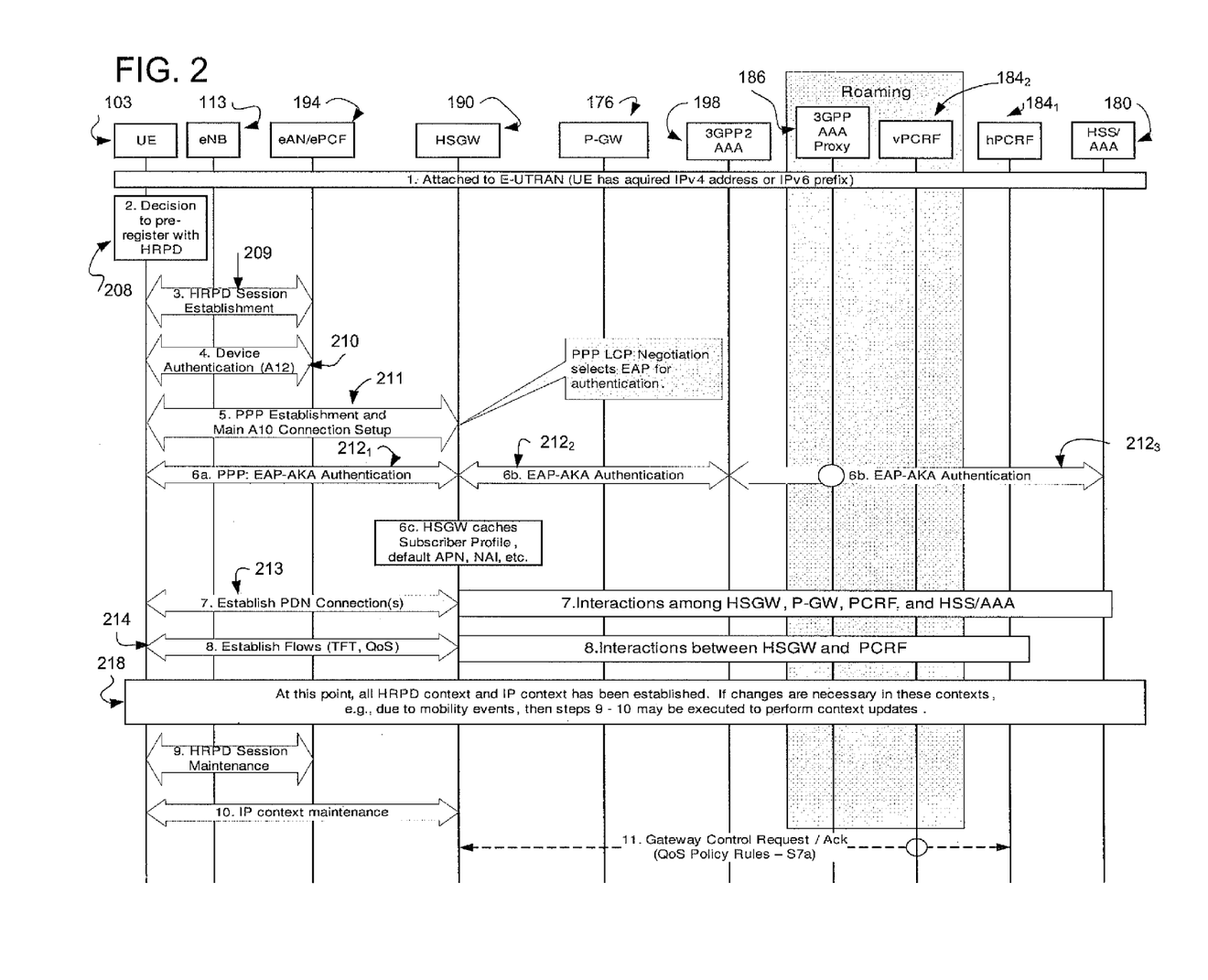
FIG. 2 illustrates a call-flow diagram for pre-registration and pre-authentication in an E-UTRAN and eHRPD internetworking.

Another issue is when to release network resources reserved by pre-registration/pre-authentication in the neighboring network. As illustrated in FIG. 2, once pre-registration/pre-authentication is accomplished with a neighboring cell or network, some contexts, including IP address, security keys, and mobility context, will be reserved for a particular user equipment or mobile station in the neighboring network. However, the user equipment may not visit visit some of the candidate cells with which the user equipment has performed pre-registration/pre-authentication. Therefore, it is important to delete the contexts in those cells in a timely manner.

Of utility then are systems and methods directed to addressing the issues and shortcomings associated with determining when to perform handoff and how long to reserve resources in wireless networks, and in particular all-IP wireless networks.

SUMMARY

An aspect of the present invention is a method for managing wireless network mobility. The method preferably comprises acquiring, at a first network equipment, one or more time samples associated with a time that one or more user devices stay in a coverage range of the first network equipment. The method also preferably comprises estimating, at a second network equipment, a time that another user device may stay in the coverage range based on the acquired time samples.

In accordance with this aspect of the present invention, the method preferably comprises processing the acquired samples using a stochastic process, wherein the stochastic process comprises a Wiener process.

Further in accordance with this aspect of the present invention, the method may comprise processing the acquired samples using time series analysis.

Further in accordance with this aspect of the present invention, the method may comprise transmitting, by the second network equipment, the estimated time to the another user device.

Further in accordance with this aspect of the present invention, the first network equipment and the second network equipment comprise the same network equipment.

Further in accordance with this aspect of the present present invention, the first or second network equipment may be selected from the group consisting of a base station, a cell phone, a mobility management entity, a home subscriber server, a serving gateway, and an authentication, authorization and accounting server.

Further still, the method may comprise receiving, at a network equipment, a pre-authentication/pre-registration request from the another user device, and performing pre-authentication/pre-registration request at the network equipment based on the estimated time.

Further in accordance with this aspect of the present invention, the method may comprise acquiring signal-to-noise ratios of one or more neighboring cells defined by the coverage of one or more neighboring base stations associated with the another user device, and determining a target cell, from among the neighboring cells, for handing off the another user device based on the acquired signal-to-noise ratios.

In another aspect, the present invention comprises a method of managing wireless network resources. The method preferably comprises acquiring, at a first network equipment, one or more time samples for a plurality of user devices associated with a first base station; and estimating, at a second network equipment, a cell residence time for another user device associated with the first base station based on the acquired time samples; determining at the second network equipment, a time to release network resources based on the estimated cell residence time.

Further in accordance with this aspect of the present invention, the estimating further comprises calculating a standard deviation of the estimated cell residence time.

Further in accordance with this aspect of the present invention, the network resource, may comprise a network address, QoS profile, security key or a bearer.

Further in accordance with this aspect of the invention, the method may comprise: receiving, at a second base station, a pre-authentication or a pre-registration request from the another user device; pre-authenticating and pre-registering, at the second base station, the another user device based on the estimated time; and reserving network resources for handing off the another user device to a neighbor cell associated with the another user device.

Further still, estimating may comprise processing the acquired time samples using a stochastic process or time series analysis, wherein the stochastic process may comprise a Wiener process.

Further still, the method may comprise transmitting by the network equipment the estimated time to another user device.

In another aspect, the present invention is a system that may comprise a base station for acquiring one or more time samples for a plurality of user devices associated with the base station; and a processor associated with a network device for estimating a cell residence time for another user device associated with the base station based on the acquired time samples.

Further in accordance with this aspect of the invention, the network device may be selected from the group consisting of a base station, a cell phone, a mobility management entity, a home subscriber server, a serving gateway, and an authentication, authorization and accounting server.

Further in accordance with this aspect of the present invention, the time samples comprise a cell residence time, a time a user device enters a cell or a time a user device leaves device leaves a cell.

DETAILED DESCRIPTION

Figure 1A:
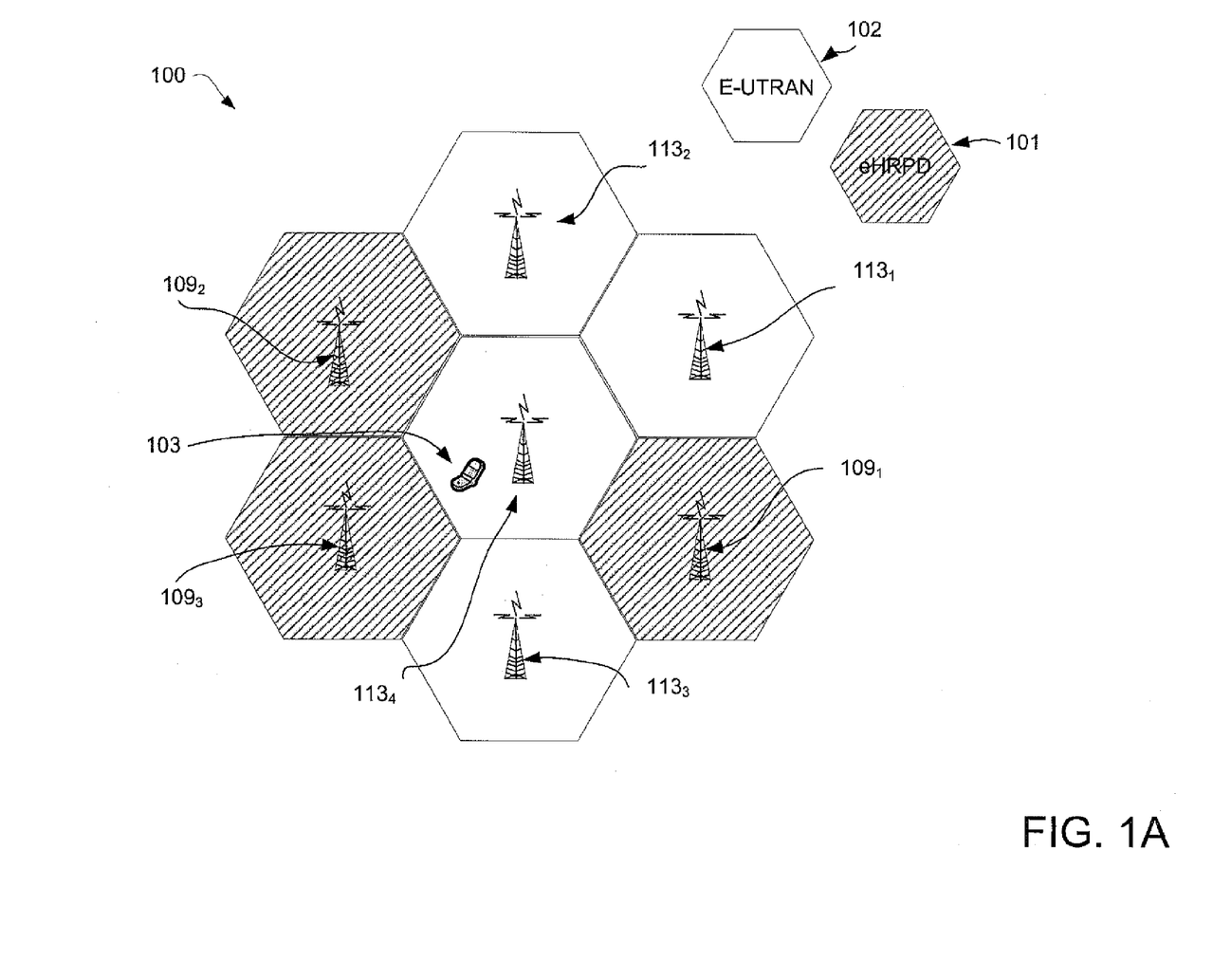
FIG. 1A illustrates an internetworking network topology of E-UTRAN and eHRPD networks.

FIG. 1A shows an internetworking network topology for E-UTRAN and eHRPD networks. As shown, the topology 100 includes an eHRPD network portion or cell 101 and an E-UTRAN network portion or cell 102. As the user equipment, mobile station or network device 103 moves between these networks or cells, 101, 102, it needs to seamlessly establish communications as appropriate through base stations 109, 113. This requires pre-authentication and pre-registration, as well as allocation of network resources to enable smooth and seamless handoffs between the networks or cells.

Figure 1B:
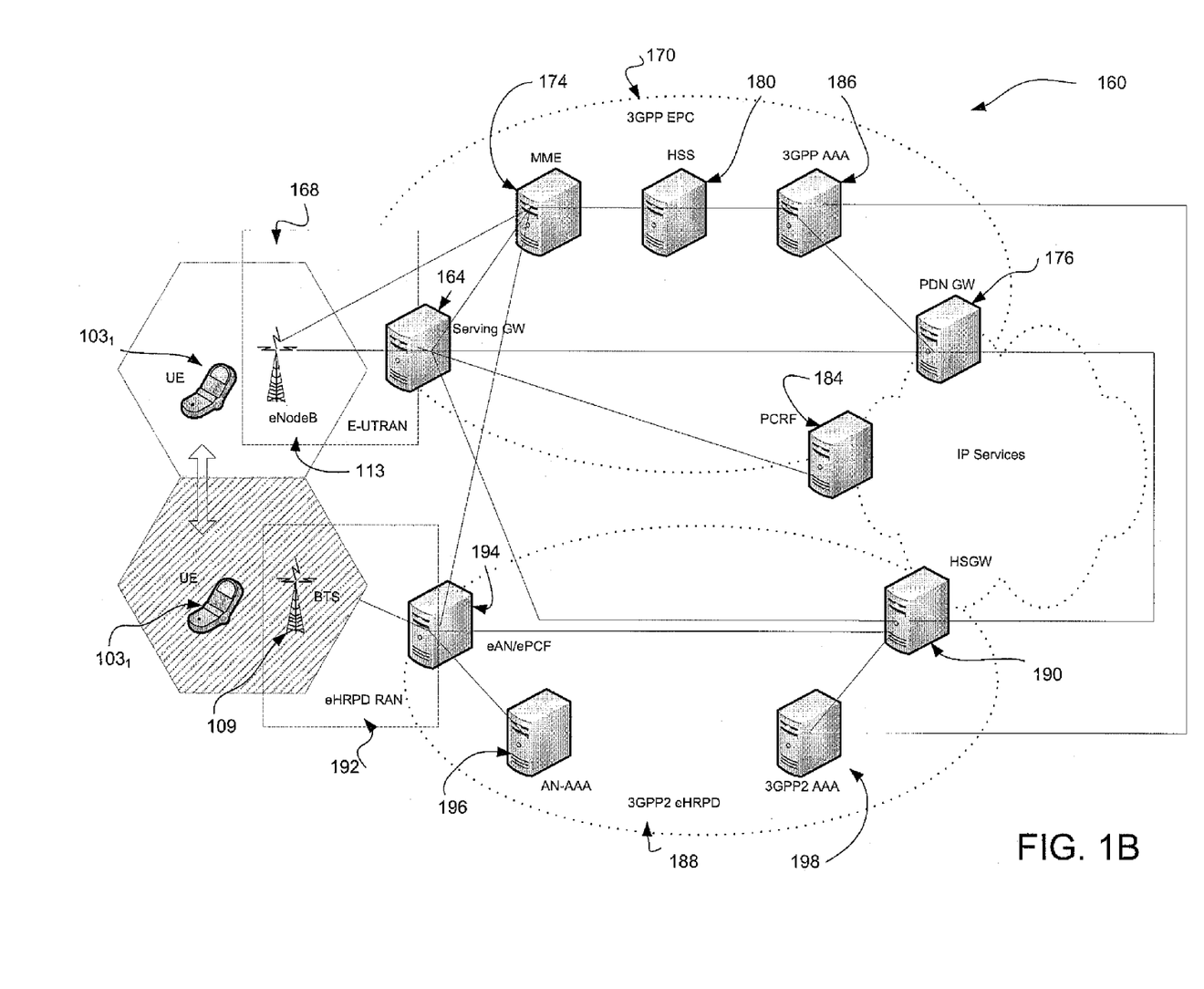
FIG. 1B illustrates a system diagram of an E-UTRAN and eHRPD internetworking architecture.

FIG. 1B shows a simplified E-UTRAN and eHRPD internetworking architecture 160. As shown, the E-UTRAN network includes a radio access network 168 that includes a base station or eNodeB (evolved Node B or eNB, which may comprise a base station) 113. eNodeB 113 is connected to one or more network equipment or elements in a 3GPP Evolved Packet Core (EPC) network 170. Specifically, eNode 113 may be connected to either a serving gateway 164 or a mobility management entity 174. The serving gateway 164 may be connected to a packet data network gateway 176 and a policy and charging rules function network element 184. The mobility management entity 174 is connected to home subscriber server 180, which is itself connected to 3GPP authentication, authorization and accounting (AAA) server 186. Though FIG. 1B shows the connections as lines between such network equipment, it should be understood that there may be intermediary equipment between the network equipment or elements. The lines shown between each network equipment are intended to illustrate that these network equipment or elements communicate, directly or indirectly, with each other.

Functionally, the serving gateway 164 transports data packets between the E-UTRAN 168 and EPC 170 portions of the network. The mobility management entity 174 is responsible for functions related to mobility management and authentication. The serving gateway 164 is associated with each user equipment $103_1$. When the user equipment moves across eNodeB 113, the serving gateway 164 serves as a local mobility anchor point. That is, it routes and forwards user packet data. A packet data network gateway 176 serves as the anchor point of packet data between 3GPP EPC and external packet data networks (not shown). There may be more than one packet data network gateway in order to access multiple packet data networks. A home subscriber server 180 stores information for a subscriber. The policy and charging rules function element 184 supports policy control and management of QoS resources. The 3GPPP AAA server 186 is responsible for authentication, authorization, and accounting.

As shown in FIG. 1B, the user equipment $103_1$ may roam to an eHRPD network 188 through an eHRPD radio access network 192. The radio access network 192 includes a base station 109 that communicates with the user equipment 103. The base station 109 is connected to an evolved access network/evolved packet control function (eAN/ePCF) 194. The eAN/ePCF 194 is connected to a HRPD serving gateway 190, an access network AAA 196, and is preferably connected to mobility management entity 174. The HRPD serving gateway 190 is connected to a 3GPP2 AAA server 198.

In the 3GPP2 eHRPD network 188, the HRPD serving gateway 190 is the serving gateway that connects the eHRPD access network with the 3GPP EPC. The eAN/ePCF 194 is a combination of evolved Access Network (eAN) and evolved Packet Control Function (ePCF). The eAN is used for radio communications with the user equipment. The ePCF manages the relay of packets between the eAN and HRPD serving gateway 190. Although logically the eAN and ePCF can be separated, as a practical matter, they are expected to be usually co-located physically when implemented. An access network AAA 196 is responsible for the authentication of the access network, which is the eHRPD radio access network 192 in FIG. 1B. A 3GPP2 AAA 198 serves as the AAA server in the eHRPD system.

With reference to FIGS. 1A and 1B, the user equipment is handed off when it moves from the cell it currently resides in to another cell. A cell is defined by the radio signal coverage area served by a base station. In 3GPP LTE, the cell coverage area may range from 1 km to 100 km. An active handoff refers to a handoff that occurs when the user equipment 103 is in an active state, i.e., a physical traffic channel exists between the user equipment 103 and the eAN/ePCF 194 and a connection exists between the eAN/ePCF 194 and the HSGW 190. and the HSGW 190. There is also a point-to-point protocol (PPP) link between the user equipment 103 and the HSGW 190. In a dormant handoff, no physical traffic channel exists between the user equipment 103 and the eAN/ePCF 194. Accordingly, in a dormant handoff the user equipment should be paged before packet data can be sent between the HSGW 190 and the user equipment 103.

There are two phases for handoff. The first phase is to perform pre-registration and pre-authentication with target neighboring cells. In this regard, when the neighboring cells are on different networks, e.g., 3GPP EPC and 3GPP2 eHRPD, handoff occurs between neighboring networks. The second phase, the handoff phase, includes the rest of the handoff procedure, i.e., having the user equipment or network device actually change networks or serving base stations. Studies have shown that registration and authentication take more time than the other procedures normally performed during a handoff. Therefore, pre-registration and pre-authentication could significantly reduce handoff latency.

Turning now to FIG. 2, there is shown a call flow depicting the steps for pre-registration and pre-authentication as part of the handoff procedures between E-UTRAN and eHRPD networks as specified in 3GPP1 X.0057. As shown, the user equipment 103 initiates the establishment of a new session 209 in the eHRPD system. After device authentication 210, the eHRPD eAN/ePCF 194 establishes a main A10 connection with the HRPD serving gateway 190. The user equipment 103 and HRPD serving gateway 190 then initiate the PPP connection establishment procedure 212. The user equipment 103 then performs user authentication and authorization by using EAP-AKA, $212_1$-$212_3$, as described in IETF RFC 4187. The EAP-AKA messages are exchanged between the user equipment 103 and HRPD serving gateway 190 using a point-to-point protocol (PPP). The EAP-AKA messages are further relayed by the 3GPP2 further relayed by the 3GPP2 AAA server 198 to the 3GPP AAA server 186, which authenticates and authorizes the user equipment.

Upon successful authentication and authorization, the 3GPP AAA server 186 queries the home subscriber server 180 and returns the packet data network gateway address to the eHRPD system. The HRPD serving gateway 190 stores the PDN GW IP address, QoS profile, and other user context information, 213, 214, received from the 3GPP AAA server 186 or home subscriber server 180. After the above steps, the network initiates resource reservation procedures to establish all dedicated bearers and complete the pre-registration/authentication process. Using this procedure, the eHRPD and IP contexts are established.

In accordance with various aspects of the present invention, wireless network mobility and resource management are enhanced by methods and systems for predicting when, whether, and with which neighboring radio cell or network the user equipment should perform pre-registration/pre-authentication, and estimating the lifetime of the contexts (e.g., reserved network resources) established during pre-registration/pre-authentication to reduce handoff delays. Specifically, the method and system use historical information to predict the user equipment's cell residence time, which is defined as the time interval from when the user equipment connects to a base station until the user equipment is handed off to another base station. As explained in detail below, the historical information preferably comprises resident time samples for user equipment that previously resided in a cell.

Figure 3:
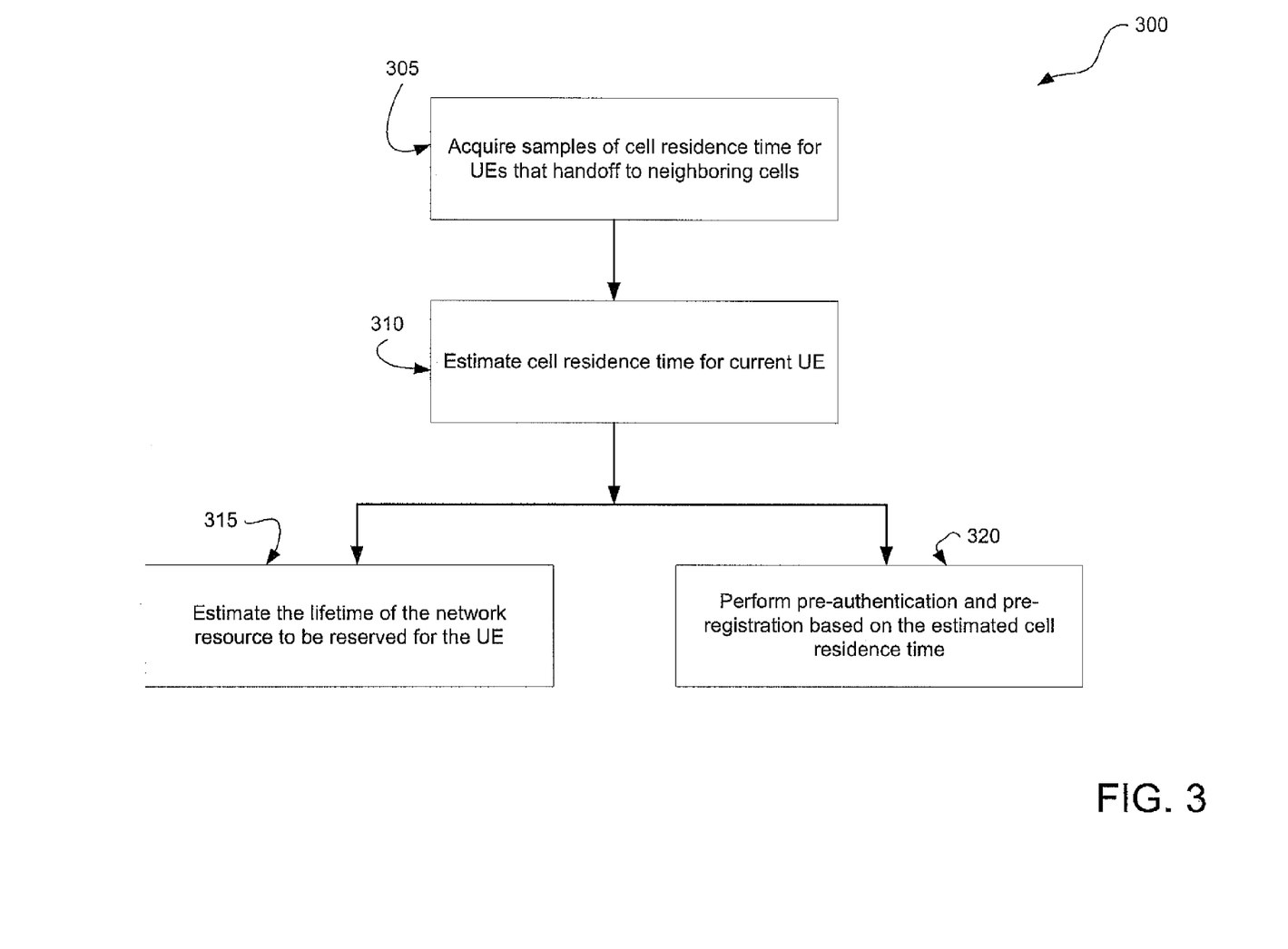
FIG. 3 illustrates a flow chart in accordance with an aspect of the present invention.

Turning now to FIG. 3, there is shown a flow chart 300 illustrating a method in accordance with an aspect of the present invention. The method begins at step 305 with a network equipment (for example, a base station) acquiring samples of cell residence time for the user equipment(s) that have resided in the cell associated with the network equipment. Typically, the cell residence time will be acquired when the user equipment(s) are being handed off to the neighboring cells from their original serving cell. In other embodiments, the cell residence time may be acquired periodically by polling the user equipment or having the periodically the user equipment report its current residence time to the network equipment.

At step 310, the network equipment, based on the samples acquired at step 305, estimates the cell residence time for the user equipment residing in a cell. Then, based on the estimated cell residence time, the network equipment estimates the lifetime of the network resources to be reserved for the user equipment at step 315, and performs pre-authentication and pre-registration for the user equipment at step 320.

Figure 4:
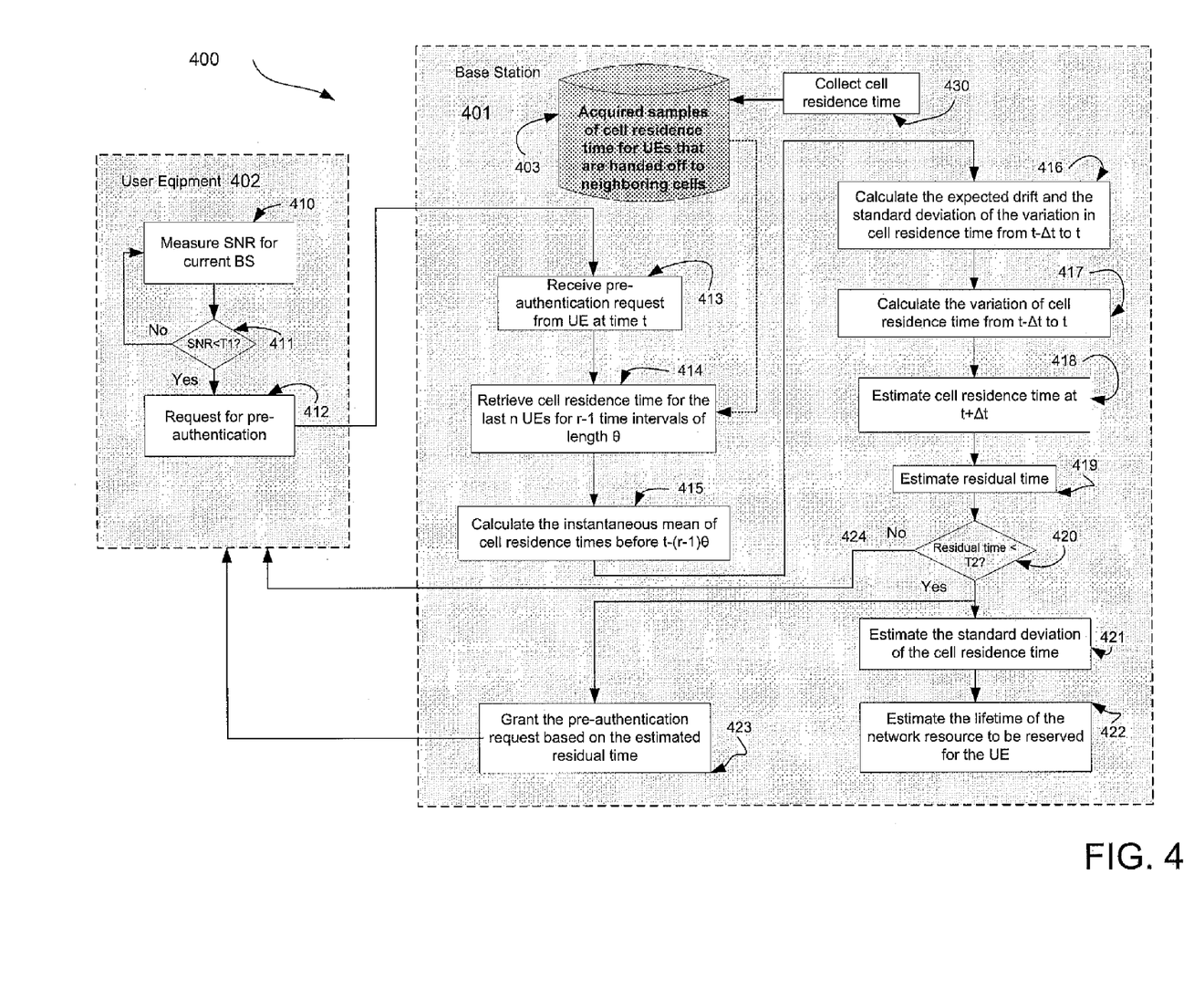
FIG. 4 illustrates a system diagram in accordance with an aspect of the system and method.

FIG. 4 shows a system 400 that may be implemented in accordance with one aspect of the present invention. In particular, FIG. 4 illustratively depicts a system 400 that comprises a base station 401 and the user equipment 402. As explained above, the base station 401 may comprise or be referred to as an eNodeB or eNB. In general, the base station 401 includes an antenna, and receiver and transmitter (together transceiver unit) for communicating user and control information to or from the user equipment 402. In that regard, the antenna is configured to radiate or receive radio frequency waves to or from the user equipment. As shown in FIGS. 1 and 2, the base station comprises a part of the RAN and is coupled to core network, e.g., EPC 170 or eHRPD 188.

The base station 401 may include a database 403 containing acquired samples of cell residence times for the user equipment that previously resided in the cell or serving area of the base station 401. Though FIG. 4 illustrates the database 403 as being part of the base station, the database may reside in the core network as shown in FIG. 2. For example, it may reside in any of network equipment or elements shown in FIG. 1B or as a separate database. Likewise, any of the steps 413-423 may also be performed by any such network equipment.

As shown in FIG. 4, at step 410, the user equipment 402 monitors the signal-to-noise Ratio (SNR) of the base station it is currently connected to or using to communicate with, for example, other user equipment. In that regard, the base station may be referred to as the serving base station in that it is the base station that is used to provide content (e.g., voice, video, etc.) to the user equipment 402. In this way, though the user equipment 402 may hear other base stations, base station 401 defines the current cell it is residing (or staying) in. Further, as mentioned above, the time that the user equipment stays or resides in base station's coverage area or cell is generally referred to as the user equipment's cell residence time.

The user equipment or the user equipment 402 generally includes any mobile device or mobile station that is able to communicate wirelessly with base station 401. Examples of the user equipment 402 include cell phones, smart phones, personal digital assistants or mobile computing devices.

At step 411, the user equipment 402 compares the current measured SNR to a predetermined threshold $T_1$ (e.g., $T_1 \leq 50\%$). If the SNR is less than $T_1$, the user equipment informs the base station that it wishes to perform pre-registration and pre-authentication with candidate neighboring base stations or cells at step 412. In steps 413-420, base station 401 (or other network equipment) makes the decision whether to trigger pre-registration/pre-authentication by estimating the cell residence time of the user equipment 402.

Specifically, base station 401 receives the pre-registration and pre-authentication request from the user equipment 402 at step 413. Then, at step 414, it retrieves, from the database 403, the collected samples of cell residence time for the user equipments that are handed off to neighboring cells from the cell served by base station 401. At steps 415-418, which will be described in further detail below, base station 401 estimates the cell residence time of the user equipment based on a statistical model. At step 419, the residual time of the user equipment is calculated. The residual time is the difference between the estimated cell residence time and the time the user equipment resided in the current cell. At 420, if the residual time of the user equipment is less than a threshold $T2$, e.g., $T2 \leq 500$ ms, base station 401 proceeds to step 423 instructing the user equipment to perform pre-registration/pre-authentication, and proceeds to estimate the standard deviation of the cell residence time at step 421. The estimated standard deviation of the cell residence time may be used, at step 422, to estimate the lifetime of the network resource to be reserved for the user equipment for performing the handoff. If the residual time is equal or larger than a predetermined threshold T2, base station 401 does not grant the pre-registration and pre-authentication request.

Figure 5A:
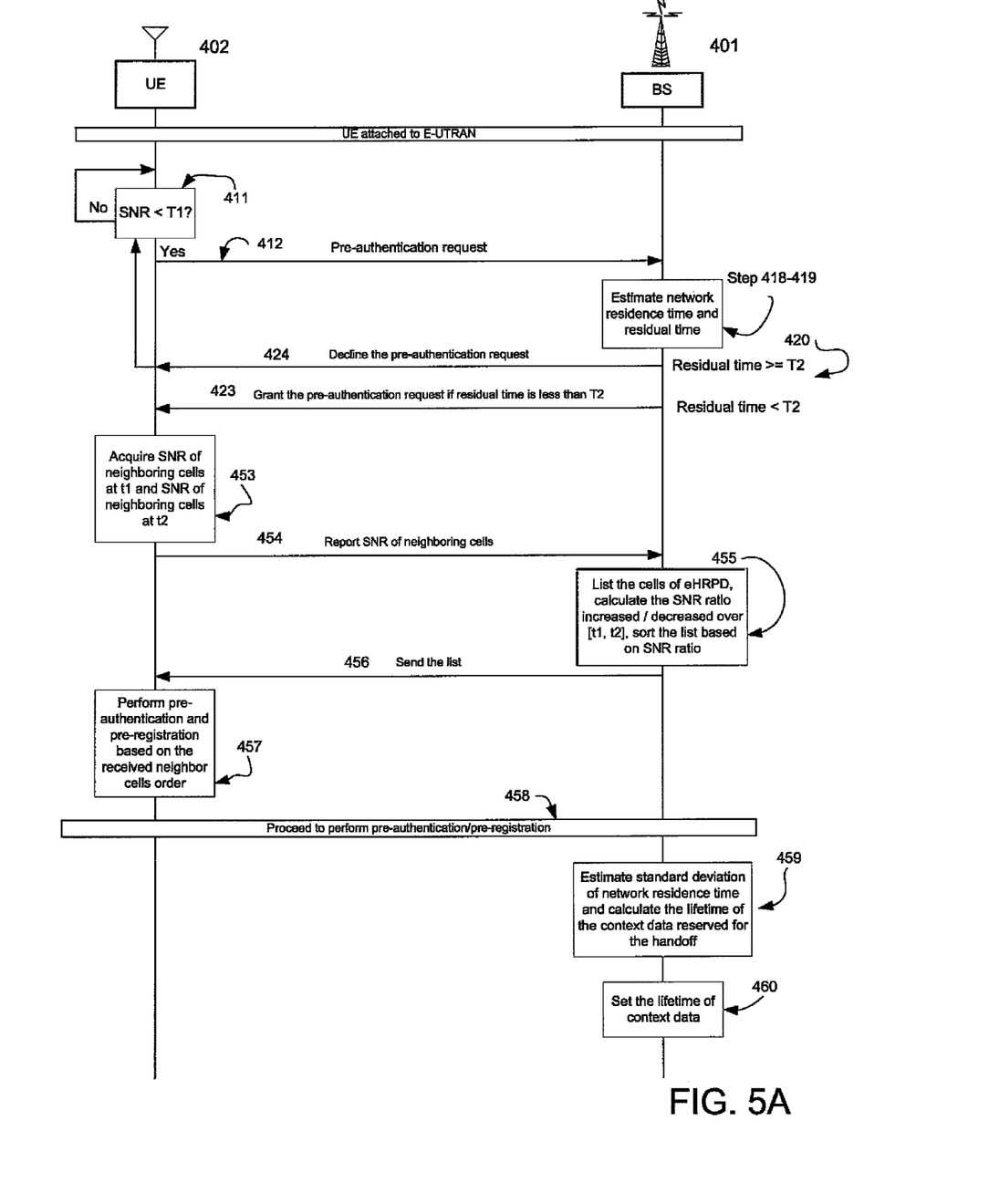
FIG. 5A illustrates a call flow diagram in accordance with an aspect of the present invention.

Turning now to FIG. 5A, there is illustrated a call flow diagram showing additional aspects of the present invention. As explained above, at step 411, the user equipment 402 compares the current measured SNR to a predetermined threshold $T_1$ (e.g., $T_1 \leq 50\%$). If the SNR is less than T1, the user equipment informs the base station that it wishes to perform pre-registration and pre-authentication with candidate neighboring base stations or cells at step 412. Base station 401 estimates cell residence time and residual time for the user equipment 402 at steps 418-419. As previously previously described in the reference to FIG. 4, at step 420, if the residual time is equal or larger than a predetermined threshold $T_2$, base station 401 declines the pre-registration/pre-authentication request at step 424. On the other hand, if the residual time of the user equipment is less than a threshold $T_2$, base station 401 grants the pre-registration/pre-authentication request at step 423.

Figure 5B:
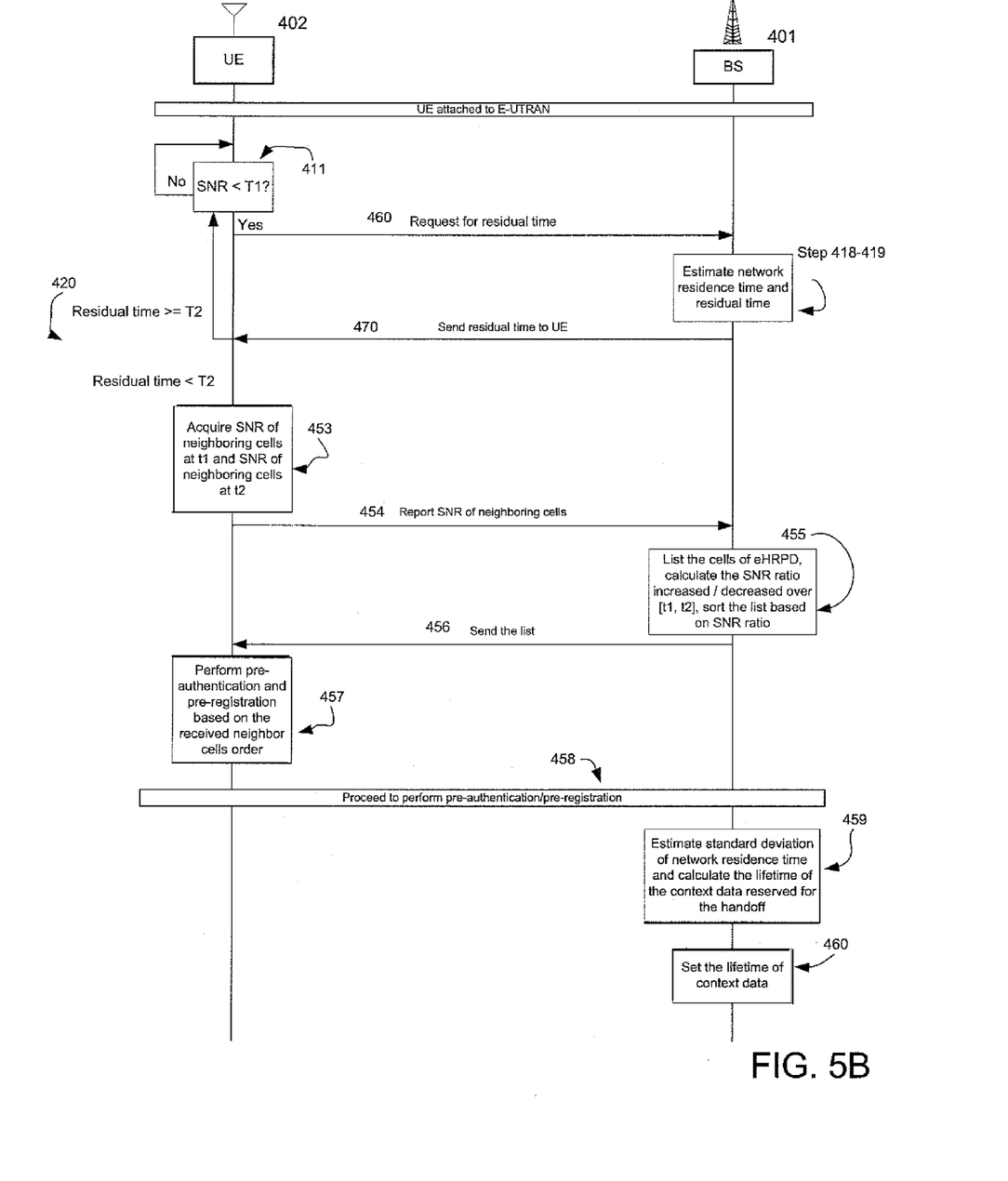
FIG. 5B illustrates a call flow diagram in accordance with an aspect of the present invention.

FIG. 5B shows another aspect of the present invention. In this aspect, the base station 401 sends the predicted cell residence time to the user equipment when the user equipment connects to the base station or when the user equipment reports to the base station that its SNR with the base station is lower than a threshold $T_1$. The user equipment itself may then use the predicted cell residence time received from the base station to determine when (and whether) it should initiate pre-registration and pre-authentication.

In a further aspect of the present invention, the base station may also transmit the cell residence times it acquires from one or more user equipments to other network equipment. These acquired residence times or samples may be stored in these other network equipment or elements and used to estimate cell residence time in the other network equipments. As mentioned previously, such network equipment may comprise network components in a 3GPP EPC, such as mobility management entity 174, home subscriber server 180, serving gateway 164, or AAA server 186. For a 3GPP2 eHRPD network, the equipment may comprise eAN/ePCF 194, access network AAA 196, or AAA server 198.

Figure 5C:
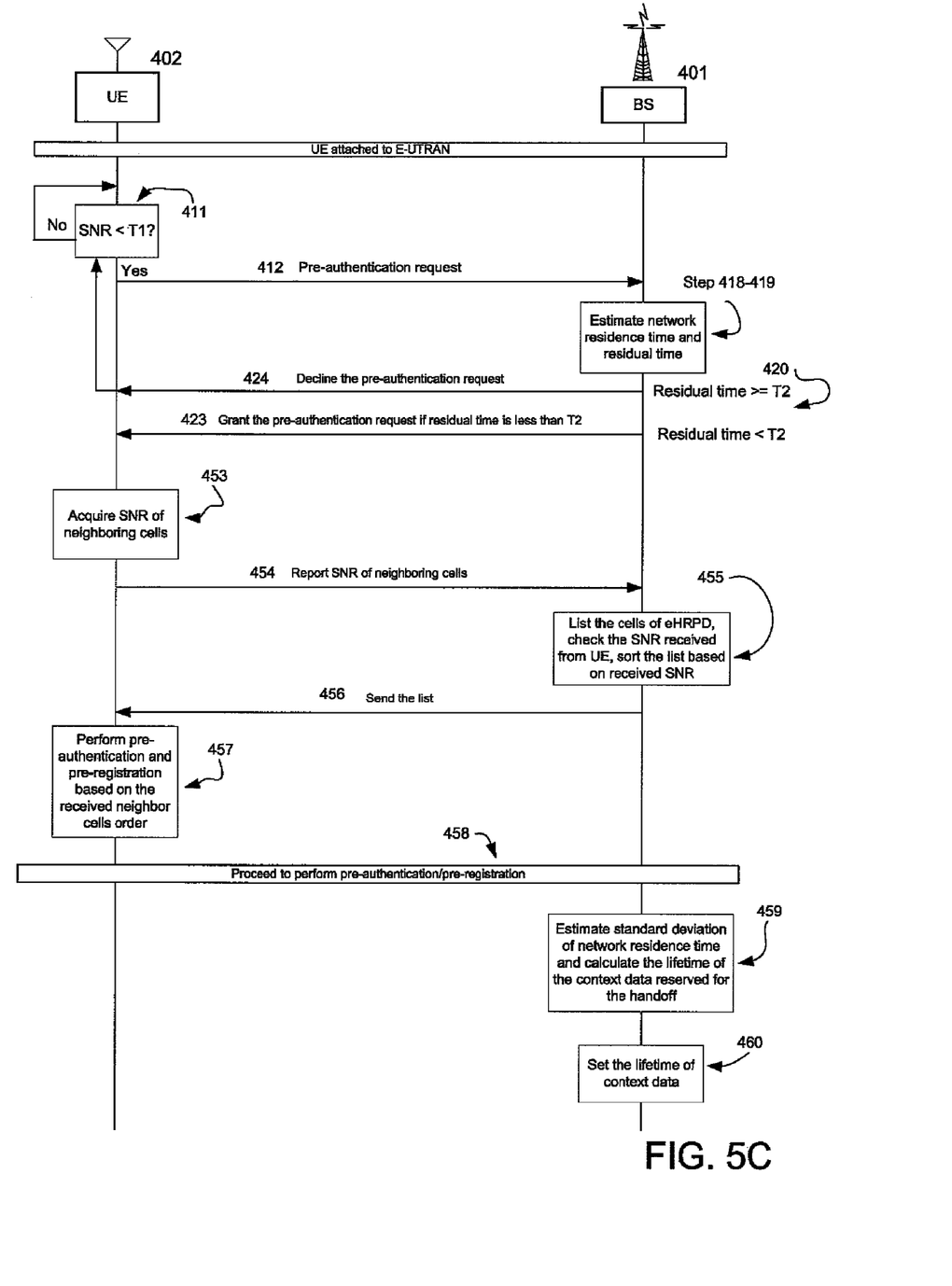
FIG. 5C illustrates a call flow diagram in accordance with an aspect of the present invention.
Figure 5D:
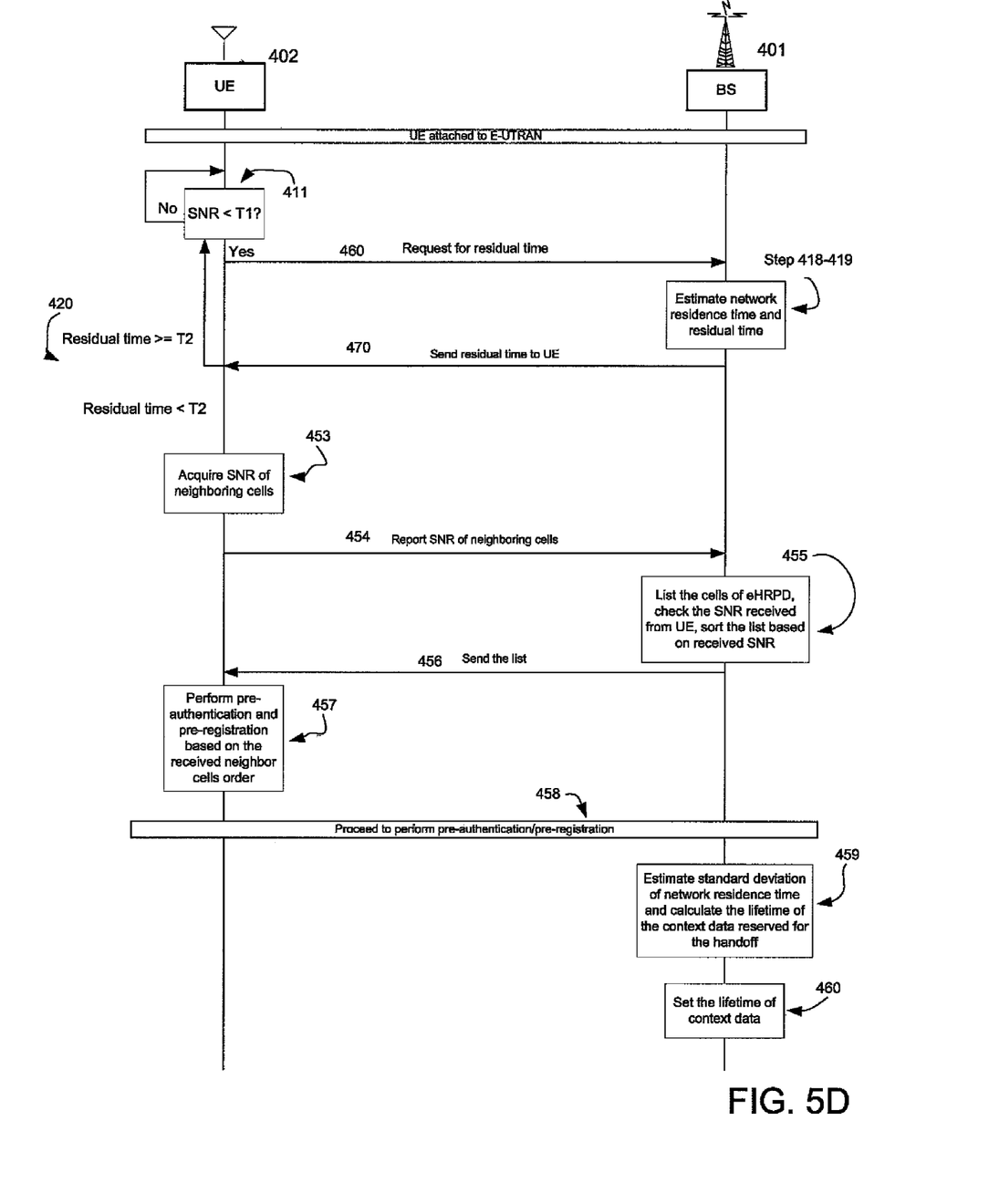
FIG. 5D illustrates a call flow diagram in accordance with an aspect of the present invention.

In another aspect of the invention, the base station may instruct the user equipment to perform pre-registration/pre-authentication with the neighboring cells in a list sorted based on the descending order of SNR. FIGS. 5C and 5D show that the user equipment collects the SNRs of neighboring cells of the base station at step 453, and report the collected SNRs to the base station at step 454. Typically, the number of neighboring cells, which may be E-UTRAN or eHRPD, is less than 10. In a handoff from a E-UTRAN to an eHRPD, the base station first lists the cells of the eHRPD. The base station then sorts the list of eHRPD cells based on the SNRs reported by the user equipment at step 455. The SNR of some or all cells in the list may be zero because it is possible that the user equipment cannot find all neighboring cells before commencing pre-registration and pre-authentication. The network then, at step 456, sends the sorted list back to the user equipment and instructs the user equipment to perform pre-registration/pre-authentication with the cells in the list based on the descending order of SNR. The reason to perform pre-registration/pre-authentication with the cell of highest SNR is that it is likely that the user equipment will roam to that cell.

In another aspect of the present invention, the base station determines the ranking of candidate cells for the user equipment's pre-registration and pre-authentication based on the ratio of increase in SNR, instead of SNR itself. A higher ratio of increase in SNR is an indication that the user equipment is moving towards that candidate cell. In FIGS. 5A and 5B, when the user equipment decides to perform pre-registration and pre-authentication, it samples the SNR for the candidate cells at step 453 over a given time period [$t_1$, $t_2$], and reports the SNR of the neighboring cells to the base station at $t_1$ and $t_2$ at step 454. Upon receiving the SNR from the user equipment, the base station calculates the rate of increase in SNR over this time period for each candidate cell at step 455. The base station then ranks the candidate cells in a descending order according to the ratio of increasing in the SNR, and sends the list back to the user equipment at step 456.

FIGS. 5A to 5D show that, the user equipment performs performs pre-registration and pre-authentication starting from the candidate cell with the highest ratio of increase in SNR or the highest SNR. After the network proceeds to the pre-registration and pre-authentication of the user equipment, the base station starts to estimate the standard deviation of network residence time and calculate the lifetime of the context data reserved for handing off the user equipment at step 459, and sets the lifetime of the context data accordingly at step 460. In other embodiments of the present invention, calculation of the context life time may be performed at other network equipment or elements. Such network equipment may comprise network components in a 3GPP EPC, such as mobility management entity 174, home subscriber server 180, serving gateway 164, or AAA server 186. For a 3GPP2 eHRPD network, the equipment may comprise eAN/ePCF 194, access network AAA 196, or AAA server 198.

In a further preferred aspect of the present invention, a Wiener process may be used to estimate the cell residence time. The Wiener process is a stochastic process that has proven effective in modeling processes where the values of the random variables are affected by a large number of independent or weakly dependent factors, each with a relatively small impact. The cell residence time is a model impacted by a large number of factors, which are either independent or weakly dependent of each other. Therefore, Wiener process provides an effective way to model the cell residence time.

In general, Wiener process, $X_t$, is defined by the following three properties:

$X_t$ is $N(0, c^2 t)$ distributed for all $t \geq 0$. N denotes the normal distribution with mean of zero and variance of $c^2 t$.

$\{X_t; t \geq 0\}$ has independent increments.

For $0 \leq s \leq t$, the increment $\{X_t - X_s\}$ is $N(0, c^2(t-s))$ distributed.

The standard Wiener process with c=1 is denoted by $\{W_t; t \geq 0\}$, in which for all $0 \leq s \leq t$, $E[W_t] = 0$, $Var(W_t) = t$. Moreover, the general Wiener process with drift or trend $\mu t$ is written as:

$$X_t = \mu t + W_t \qquad (1)$$

Let $\Delta t$ be the prediction time interval and $\alpha$ be a standard normal random variable. By using the general Wiener process, the variation, $\Delta K$, can be written as:

$$\Delta K = K(t) - K(t - \Delta t) = \alpha \sqrt{\Delta t} \qquad (2)$$

$\Delta K$ is the variation from $t - \Delta t$ to t. The quantity of $\Delta K$ is computed every $\Delta t$ time unit. $\Delta K$ can be modeled as a normal random variable for any given $\Delta t$. Furthermore, the variation of Wiener process in the following equation allows the mean and the standard deviation of $\Delta K$ to change over time:

$$\Delta K = \mu \Delta t + \alpha \delta \sqrt{\Delta t} \qquad (3)$$

where $\mu$ and $\delta$ are constants. As shown in Equation (3), $\Delta K$ becomes a normal distributed random variable with mean $\mu \Delta t$ and standard deviation $\delta \sqrt{\Delta t}$. It suggests that the mean and the standard deviation of $\Delta K$, for any given time interval $\Delta t$, can be calculated directly from $\mu$ and $\delta$. Therefore, $\mu$ and $\delta$ are referred to as the expected drift and the standard deviation rate of $\Delta K$, respectively. Moreover, for any given time interval $\theta$, $\mu$ and $\delta$ can be estimated based on the mean and variance of the sample value of $\Delta K$ in previous time intervals of length $\theta$. Let $k(t)$ be a sample value of $K(t)$, the sample values of $\Delta K$ in the previous r time intervals $[t - i\theta - \theta, t - i\theta]$ are $k(t - i\theta) - k(t - i\theta - \theta)$, where $i = 0, \ldots, r-1$. Hence, $\mu$ can be estimated by $\hat{\mu}$:

$$\hat{\mu} = \frac{\sum_{i=0}^{r-1}(k(t - i\theta) - k(t - i\theta - \theta))}{r\theta} = \frac{k(t) - k(t - r\theta)}{r\theta} \qquad (4)$$

Also $\hat{\delta}$, the estimation of $\delta$, is given by:

$$\hat{\delta} = \sqrt{\frac{\sum_{i=0}^{r-1}(k(t - i\theta) - k(t - i\theta - \theta) - \hat{\mu}\theta)^2}{r\theta}} \qquad (5)$$

By using Equations (3)-(5), $\Delta K$ can be closely estimated when r is large enough. Usually 25 is enough for r. The Wiener process can estimate the value of $K(t + \Delta t)$ in the near future by using the old records in any given sampling time interval $\theta$.

Cell residence times may vary widely for different user equipments, especially in an E-UTRAN-eHRPD interworking network system. Therefore, $k(t - i\theta)$ is defined to represent the instantaneous mean of cell residence time for the n last user equipments that performed handoff to the neighboring cell before $t - i\theta$, for all $i = 0, \ldots, r-1$. The $k(t - i\theta)$ is then used in Equations (4)-(5) to compute $\hat{\mu}$ and $\hat{\delta}$, which are then used to generate $\Delta K$ by using Equation (3). When using the Wiener process, at first, a base station needs to run $r \times \theta$ time units to collect enough samples. After that, the base station can start to compute the estimated value of $\Delta K$ using Equations (3)-(5). The estimated $K(t + \Delta t)$ then can be computed by $\Delta K$ and $K(t)$.

The above steps of the Wiener process are illustrated as steps 413-18 in FIG. 4. Specifically, at time t, base station 401 receives the pre-registration and pre-authentication request from the user equipment 402 at step 413. Then, at step 414, it retrieves, from the database 403, for example, the collected samples of cell residence time for the last n user equipments for r−1 time intervals of length θ. At step 415, the instantaneous mean of cell residence times before t−(r−1)θ is calculated. Then at step 416, base station 401 calculates the expected drift and the standard deviation of the variation in cell residence time from t−Δt to t. The variation of cell residence time from t−Δt to t is then calculated at step 417. At step 418, the cell residence time cell residence time for the user equipment 402 is estimated based on the calculated variation of cell residence time from t−Δt to t.

In other embodiments of the present invention, other statistic models, such as time series analysis, could be used to estimate cell residence time. Other models, including averaging, may also be used to estimate the cell residence time.

In another aspect of the invention, the context lifetime of the network resources reserved by pre-registration/authentication can be estimated based on the cell residence time. If the predicted context lifetime is shorter than the residual cell residence time, the reserved context can expire before handoff begins. This may impact the pre-registration/pre-authentication process, rendering it meaningless in some cases.

A standard deviation of the cell residence time, estimated by equations (3)-(5), can be calculated. std(t−iθ) is defined as the instantaneous standard deviation of the cell residence times of the n user equipments that performed handoff to the neighboring cell before t−i θ, for all i=0, ..., r−1. The std(t−i θ) is also calculated by k(t−i θ) and all user equipments in the cell within the time interval [t−i θ−θ, t−i θ], for all i=0, ..., r−1.

As previously described, K(t+Δt) then can be computed by ΔK and K(t). Let σ(t−Δt) denote the estimated standard deviation of cell residence time. That is, σ(t+Δt)=std(t). To increase the probability that the user equipment's context lifetime does not expire before the user equipment performs handoff, the context lifetime can be predicted as follows, where a is a confidence coefficient of a positive real number. For example, when a=2, the probability that the user equipment's actual context lifetime will be longer than the predicted context lifetime will be less than 5%.

Context Lifetime=$K(t+\Delta t)+a \times \sigma(t+\Delta t)$

One approach to releasing reserved network resources is, once the user equipment moves into a cell, using explicit signaling to trigger other cells to delete the contexts. However, network architecture and new signaling flows may need to be changed or defined to implement this procedure. In 3GPP2 eHRPD, a base station cannot talk to another base station directly. The signaling messages will need to go through eAN/ePCF or even HSGW to reach another base station. Although eNodeB in eGPP EPS can be connected by an interface called X2 Interface, the primary purpose of X2 Interface is to forward packets from old eNodeB to new eNodeB after handoff. The use of X2 Interface for deleting unused contexts will need to be standardized. For the handoffs from E-UTRAN and eHRPD, the signaling messages between base stations will need to go through the PDN GW, which will result in a long routing path. In addition to standardization issues, this approach significantly increases the complexity of pre-registration/pre-authentication.

For the above purpose, each pre-established context can have a context lifetime that expires on itself. This avoids the need for the user equipment to use additional signaling to instruct the neighboring networks to remove the pre-established text, hence significantly reduces the complexity of pre-registration/pre-authentication.

How to determine the lifetime of the pre-established context is important. If the context lifetime is too long or infinite, the reserved resources in the unused contexts will be wasted in both the candidate networks and the user equipment because these reserved resources cannot be used by other user equipments. If there are many user equipments performing pre-registration/pre-authentication, the resources in each cell in each cell could even be exhausted unnecessarily. Besides, the unused security key materials might lead to security problems if they are not deleted. On the other hand, if the contexts are deleted before handoff takes place, the user equipment needs to re-do the registration/authentication and re-establish the context again when it visits the cell. The pre-registration/pre-authentication executed earlier then becomes useless, and the messaging overhead and computing overhead on the user equipment and the base station are increased. This problem becomes especially important for a large scale network.

An arbitrarily chosen static context lifetime has been proven to result in bad performance. One evaluation criterion is call blocking/handoff dropping probability. A longer lifetime leads to a higher call blocking/handoff dropping probability. Clearly, the blocking probability of new calls will drop if more resources are reserved for handoff calls. On the other hand, the handoff dropping probability will drop if more resources are reserved for new calls. Therefore a shorter lifetime performs better in terms of call blocking/handoff dropping probability.

Another evaluation criterion is the measurement of how many contexts reserved are actually used. This could be defined as a hit rate:

$$\text{Hit rate} = \frac{N_{NotExpired}}{N_{UE}} \times 100\%$$

As the context lifetime increases, the hit rate increases too. Conversely, shorter context lifetime results in a low hit rate. Thus, the two performance metrics of call blocking/handoff dropping probability and hit rate conflict each other with the use of a static context lifetime. A dynamic context lifetime algorithm is therefore needed.

After the user equipment is handed off into a candidate cell, the context lifetime reserved for the user equipment in this candidate cell will be reset to last as long as the user equipment stays inside this cell.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure may be embodied as a program, software, or computer instructions embodied in a computer or machine usable or readable medium, which causes the computer or machine to perform the steps of the method when executed on the computer, processor, and/or machine. More particularly, the methods described herein may be reduced to programming instructions that are stored in memory and executed by a process or central processing unit (CPU), microprocessor or the like. Such processors may include those made by Intel, AMD or any other similar products. In addition, the instructions may also be programmed to operate using application specific integrated circuits (ASICs), which may make the method more portable to, for example, a base station or the user equipment.

The system and method of the present disclosure may be implemented and run on a general-purpose computer or special-purpose computer system. The computer system may be any type of known or will be known system and may typically include a processor, memory device, a storage device, input/output devices, internal buses, and/or a communications interface for communicating with other computer systems in conjunction with conjunction with communication hardware and software, etc.

As mentioned above, the user equipment, mobile station or user devices of the present disclosure may include mobile device, such as a cell phone, a mobile computer, a mobile media recorder, a mobile media player, a mobile game console, a navigation device, a communication device and accessories. The wireless networks between which the mobile device performs handoff may comprise 3GPP, 3GPP2 or WiFi network.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
acquiring, at a network equipment, one or more time samples associated with a time that a plurality of first devices stay in a coverage range of the network equipment;
estimating an amount of time that a second device will stay in the coverage range based at least in part on the one or more acquired time samples, wherein the estimated amount of time changes over time as the one or more acquired time samples change over time, and wherein said estimating the amount of time further comprises processing the one or more acquired time samples using a stochastic process;
estimating a context lifetime for the second device based at least in part on the estimated amount of time, wherein the context lifetime comprises an amount of time for which network resources to be used during a handoff of the second device are to be reserved;
receiving a pre-authentication request from the second device; and
determining whether to pre-authenticate the second device based at least in part on the estimated amount of time or on the estimated lifetime of network resources to be reserved for the second device.

2. The method of claim 1, wherein the network equipment comprises at least one of a base station, a cell phone, a mobility management entity, a home subscriber server, a serving gateway, or an authentication, authorization, and accounting server.

3. The method of claim 1, wherein the estimating the amount of time is performed by the network equipment.

4. The method of claim 1, wherein the stochastic process comprises a Wiener process.

5. The method of claim 1, further comprising transmitting the estimated amount of time to the second device.

6. The method of claim 1, wherein the second device comprises at least one of a cell phone, a mobile computer, a mobile media recorder, a mobile media player, a mobile game console, a navigation device, a communication device, or a communication accessory.

7. The method of claim 1, further comprising:
receiving a pre-registration request from the second device; and
performing pre-registration of the second device based at least in part on the pre-authentication of the second device.

8. The method of claim 1, further comprising acquiring one or more signal-to-noise ratios of one or more neighbor cells defined by coverage ranges of one or more neighboring base stations associated with the second device.

9. The method of claim 8, further comprising determining a target cell, from among the one or more neighbor cells, for handing off the second device based at least in part on the one or more acquired signal-to-noise ratios.

10. A method comprising:
acquiring, at a network equipment, one or more time samples for a plurality of first devices associated with a first base station;
estimating a cell residence time for a second device associated with the first base station based on the one or more acquired time samples, wherein the estimated cell resident time changes over time as the one or more acquired time samples change over time, and wherein said estimating the cell residence time further comprises processing the one or more acquired time samples using a stochastic process;
estimating a context lifetime for the second device based at least in part on the estimated cell residence time, wherein the context lifetime comprises an amount of time for which network resources to be used during a handoff of the second device are to be reserved; and
determining a time for releasing a network resource based on the estimated cell residence time or on the estimated lifetime of network resources to be reserved for the second device.

11. The method of claim 10, further comprising calculating a standard deviation of the estimated cell residence time.

12. The method of claim 10, wherein the network resource comprises at least one of a network address, a network bearer, a quality of service profile, or a security key.

13. The method of claim 10, further comprising:
receiving, at a second base station, a pre-authentication request and a pre-registration request from the second device;
pre-authenticating and pre-registering, at the second base station, the second device based at least in part on the estimated cell residence time; and
reserving one or more network resources for handing off the second device to a neighbor cell associated with the second device.

14. The method of claim 10, wherein the network equipment comprises at least one of a base station, a cell phone, a mobility management entity, a home subscriber server, a serving gateway, or an authentication, authorization, and accounting server.

15. The method of claim 10, wherein the stochastic process comprises a Wiener process.

16. The method of claim 10, further comprising transmitting, by the network equipment, the estimated cell residence time to the second device.

17. A system, comprising:
a base station configured to acquire one or more time samples for a plurality of first devices associated with the base station; and
a network element comprising at least a processor, wherein the network element is configured to:
estimate a cell residence time for a second device associated with the base station based at least in part on the one or more acquired time samples, wherein the estimated cell residence time changes over time as the one or more acquired time samples change over time, and wherein the network element is configured to use a stochastic process on the one or more acquired time samples to estimate the cell residence time;
estimate a context lifetime for the second device based at least in part on the estimated cell residence time, wherein the context lifetime comprises an amount of time for which network resources to be used during a handoff of the second device are to be reserved;
receive a pre-authentication request from the second device; and
determine whether to pre-authenticate the second device based at least in part on the estimated amount of time or on the estimated lifetime of network resources to be reserved for the second device.

18. The system of claim 17, wherein the network element comprises at least one of the base station, a cell phone, a mobility management entity, a home subscriber server, a serving gateway, or an authentication, authorization, and accounting server.

19. The system of claim 18, wherein the one or more time samples comprise one or more cell residence times of the plurality of first devices.

20. An apparatus comprising:
a receiver configured to receive one or more time samples associated with a time that a plurality of first devices stay in a coverage range of the apparatus; and
a processor operatively coupled to the receiver and configured to estimate an amount of time that a second device will stay in the coverage range based at least in part on the one or more acquired time samples, wherein the estimated amount of time changes over time as the one or more acquired time samples change over time, and wherein the processor is configured to use a stochastic process on the one or more acquired time samples to estimate the amount of time;
wherein the processor is further configured to estimate a context lifetime for the second device based at least in part on the estimated amount of time, wherein the context lifetime comprises an amount of time for which network resources to be used during a handoff of the second device are to be reserved;
wherein the receiver is further configured to receive a pre-authentication request from the second device, and
wherein the processor is further configured to determine whether to pre-authenticate the second device based at least in part on the estimated amount of time or on the estimated lifetime of network resources to be reserved for the second device.

21. The apparatus of claim 20, further comprising a transmitter operatively coupled to the processor and configured to transmit the estimated amount of time to the second device.

22. The apparatus of claim 20, wherein the receiver is further configured to receive one or more signal-to-noise ratios of one or more neighbor cells defined by coverage ranges of one or more neighboring base stations associated with the second device.

23. The apparatus of claim 22, wherein the processor is further configured to identify a target cell, from among the one or more neighbor cells, for handing off the second device based at least in part on the one or more signal-to-noise ratios.

24. A non-transitory computer-readable medium having computer-readable instructions stored thereon, the instructions comprising:
instructions to receive one or more time samples associated with a time that a plurality of first devices stay in a coverage range;
instructions to estimate an amount of time that a second device will stay in the coverage range based at least in part on the one or more acquired time samples, wherein the estimated amount of time changes over time as the one or more received samples change over time, and wherein the instructions use a stochastic process on the one or more acquired time samples to estimate the amount of time;
instructions to estimate a context lifetime for the second device based at least in part on the estimated amount of time, wherein the context lifetime comprises an amount of time for which network resources to be used during a handoff of the second device are to be reserved;
instructions to receive a pre-authentication request from the second device; and
instructions to determine whether to pre-authenticate the second device based at least in part on the estimated amount of time or on the estimated lifetime of network resources to be reserved for the second device.

25. The non-transitory computer-readable medium of claim 24, further comprising instructions to receive one or more signal-to-noise ratios of one or more neighbor cells defined by coverage ranges of one or more neighboring base stations associated with the second device.

26. The non-transitory computer-readable medium of claim 25, further comprising instructions to identify a target cell, from among the one or more neighbor cells, for handing off the second device based at least in part on the one or more signal-to-noise ratios.

27. The non-transitory computer-readable medium of claim 24, wherein the second device is not one of the plurality of first devices associated with the one or more time samples.

28. The method of claim 1, wherein pre-authentication of the second device is not performed if the estimated lifetime of network resources to be reserved for the second device is less than the estimated time that the second device will stay in the coverage range.

29. The method of claim 1, wherein the plurality of first devices are the last devices that performed handoff from the network equipment.

* * * * *